(12) United States Patent
Patten et al.

(10) Patent No.: US 9,342,280 B2
(45) Date of Patent: May 17, 2016

(54) TRAVEL LOG FOR MANIPULATION OF CONTENT

(75) Inventors: Michael J. Patten, Sammamish, WA (US); Paul Armistead Hoover, Bothell, WA (US); John Wesley Terrell, Kirkland, WA (US); Nicholas R. Waggoner, Newcastle, WA (US)

(73) Assignee: Microsoft Technology Licesning, LLC, Redmond, WA (US)

( * ) Notice: Subject to any disclaimer, the term of this patent is extended or adjusted under 35 U.S.C. 154(b) by 929 days.

(21) Appl. No.: 13/117,938

(22) Filed: May 27, 2011

(65) Prior Publication Data

US 2012/0304082 A1      Nov. 29, 2012

(51) Int. Cl.
*G06F 3/0481* (2013.01)
*G06F 9/44* (2006.01)
*G06F 3/0488* (2013.01)

(52) U.S. Cl.
CPC .............. *G06F 8/38* (2013.01); *G06F 3/04817* (2013.01); *G06F 3/04883* (2013.01)

(58) Field of Classification Search
CPC ............ G06F 3/0481; G06F 8/34; G06F 8/38
USPC ........................................................ 715/762
See application file for complete search history.

(56) References Cited

U.S. PATENT DOCUMENTS

| | | | | |
|---|---|---|---|---|
| 6,310,630 B1* | 10/2001 | Kulkarni | ............... | G06F 3/0483 707/E17.112 |
| 7,810,035 B2* | 10/2010 | Dominowska | .... | G06F 17/30873 715/206 |
| 7,908,282 B2* | 3/2011 | Naick | ............... | G06F 17/30884 707/752 |
| 8,041,701 B2* | 10/2011 | Amato | ............... | G06F 17/30864 707/707 |
| 8,106,856 B2* | 1/2012 | Matas | ................... | G06F 3/0485 345/156 |
| 8,201,096 B2* | 6/2012 | Robert | ................ | G06F 3/04817 715/713 |
| 8,225,396 B1* | 7/2012 | Gauvin | .................. | G06F 21/606 705/319 |
| 8,305,355 B2* | 11/2012 | Matas | ................... | G06F 3/0485 345/156 |
| 8,448,260 B1* | 5/2013 | Hansen | ................... | G06F 21/62 726/27 |
| 8,655,939 B2* | 2/2014 | Redlich | .................... | F41H 13/00 707/602 |
| 2004/0003351 A1* | 1/2004 | Sommerer | ........ | G06F 17/30876 715/251 |
| 2004/0030741 A1* | 2/2004 | Wolton | ............. | G06F 17/30873 709/202 |
| 2006/0101341 A1* | 5/2006 | Kelly | ................. | G06F 17/30899 715/738 |
| 2006/0181736 A1* | 8/2006 | Quek | ................... | G03D 15/005 358/1.18 |
| 2006/0224997 A1* | 10/2006 | Wong | ................ | G06F 17/30884 715/838 |
| 2006/0265417 A1* | 11/2006 | Amato | ............. | G06F 17/30864 |

(Continued)

OTHER PUBLICATIONS

Apple, "iPhone User Guide for iOS 4.2 and 4.3 software", released on Mar. 2011, 274 pages.*

(Continued)

*Primary Examiner* — Reza Nabi
(74) *Attorney, Agent, or Firm* — Jim Banowsky; Judy Yee; Micky Minhas

(57) ABSTRACT

Various embodiments provide a travel log for manipulation of content. In at least some embodiments, the travel log can be presented as a visual element of a web browser and can enable a user to navigate through visited content (e.g., web pages) via manipulation of the content using touch-based and/or touchless gestures. Implementations can facilitate navigation through content by representing the travel log as a visual "time line" of visited content that can be scrolled via manipulation through a web browser user interface. For example, a user can navigate the travel log to older content by manipulating the travel log in one direction, and can navigate the travel log to newer content by manipulating the travel log in a different direction.

21 Claims, 12 Drawing Sheets

(56) References Cited

U.S. PATENT DOCUMENTS

| | | | | |
|---|---|---|---|---|
| 2007/0011616 | A1* | 1/2007 | Ording | G06F 17/30887 715/738 |
| 2008/0052945 | A1* | 3/2008 | Matas | G06F 3/0485 34/173 |
| 2008/0168135 | A1* | 7/2008 | Redlich | G06Q 10/10 709/204 |
| 2008/0307343 | A1* | 12/2008 | Robert | G06F 3/04817 715/765 |
| 2009/0150518 | A1* | 6/2009 | Lewin | H04L 67/2842 709/219 |
| 2009/0300528 | A1* | 12/2009 | Stambaugh | G06F 3/04817 715/764 |
| 2010/0023398 | A1 | 1/2010 | Brown et al. | |
| 2010/0070928 | A1* | 3/2010 | Goodger | G06F 17/30905 715/838 |
| 2010/0095219 | A1* | 4/2010 | Stachowiak | G06F 17/30884 715/745 |
| 2011/0225195 | A1* | 9/2011 | Kubicki | G06F 17/30887 707/776 |
| 2011/0296308 | A1* | 12/2011 | Yi | G06F 21/52 715/733 |
| 2012/0102426 | A1* | 4/2012 | Kim | G06F 3/0483 715/776 |
| 2012/0127207 | A1* | 5/2012 | Matas | G06F 3/0485 345/676 |
| 2013/0061175 | A1* | 3/2013 | Matas | G06F 3/0485 715/810 |

OTHER PUBLICATIONS

Apple, "iPhone User Guide for iOS 4.2 and 4.3 software", released on Mar. 2011,274 pages.*

Dragicevic, et al., "Video Browsing by Direct Manipulation", Retrieved at <<http://citeseerx.ist.psu.edu/viewdoc/download?doi=10.1.1.139.1889&rep=rep1&type=pdf>>, Proceeding of the twenty-sixth annual SIGCHI conference on Human factors in computing systems, Apr. 5-10, 2008, pp. 237-146.

Wilson, Jeffrey L., "Opera 11 Arrives With Tab Stacking, Visual Mouse Gestures", Retrieved at <<http://www.pcmag.com/article2/0,2817,2374301,00.asp>>, Retrieved Date: May 6, 2011, pp. 3.

"Safari Features", Retrieved at <<http://www.apple.com/safari/features.html>>, Retrieved Date: May 6, 2011, pp. 15.

"Introduction to the Visual C++ Annotated Travel Log Starter Kit", http://msdn.microsoft.com/en-us/library/aa730871%28v=vs.80%29.aspx>>, May 2006, pp. 28.

* cited by examiner

TRAVEL LOG FOR MANIPULATION OF CONTENT

BACKGROUND

Current web browser paradigms have inefficiencies that can degrade the user experience. For example, a typical web browser includes navigation buttons (e.g., forward and backward buttons) that a user can select to navigate forward and backward through various web pages. This type of navigation can be counter-intuitive and can cause a user to focus away from web page content to locate and actuate the navigation buttons.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments provide a travel log for manipulation of content. In at least some embodiments, the travel log can be presented as a visual element of a web browser and can enable a user to navigate through visited content (e.g., web pages) via manipulation of the content using touch-based and/or touchless gestures. Implementations can facilitate navigation through content by representing the travel log as a visual "time line" of visited content that can be scrolled via manipulation through a web browser user interface. For example, a user can navigate the travel log to older content by manipulating the travel log in one direction, and can navigate the travel log to newer content by manipulating the travel log in a different direction.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments provide a travel log for manipulation of content. In at least some embodiments, the travel log can be presented as a visual element of a web browser and can enable a user to navigate through visited content (e.g., web pages) via manipulation of the content using touch-based and/or touchless gestures. Implementations can facilitate navigation through content by representing the travel log as a visual "time line" of visited content that can be scrolled via manipulation through a web browser user interface. For example, a user can navigate the travel log to older content by manipulating the travel log in one direction, and can navigate the travel log to newer content by manipulating the travel log in a different direction.

For instance, consider a scenario where a user is viewing a current web page via a web browser user interface. The user can manipulate the current web page in a first direction (e.g., using a touch-based and/or touchless gesture) to scroll a travel log to web pages that were visited prior to the current web page. Further, the user can manipulate the current web page in a second direction to scroll the travel log to web pages that were visited subsequent to the current web page. Additional ways in which a travel log can be accessed and manipulated are discussed below in more detail.

In at least some embodiments, manipulation of content can be considered to be a "direct manipulation" of the content. For example, navigation through a travel log can be responsive to a manipulation of an instance of content, and not solely based on gesture-based input from a user. Thus, embodiments can be considered to be "object-centric" in that techniques can sense and/or respond to movement of objects (e.g., instances of content) and do not necessarily respond only to sensing gesture-based input.

In the following discussion, an example environment is first described that is operable to employ the techniques described herein. Next, a section entitled "Example Travel Log" describes an example travel log in accordance with one or more embodiments. Following this, a section entitled "Travel Log Interface Navigation" describes example travel log navigation techniques in accordance with one or more embodiments. Next, a section entitled "Example Methods" describes example methods in accordance with one or more embodiments. Following this, a section entitled "Secure Placeholders" describes implementations using secure placeholders, in accordance with one or more embodiments. Last, a section entitled "Example Device" describes aspects of an example device that can be utilized to implement one or more embodiments.

Example Environment

Figure 1:
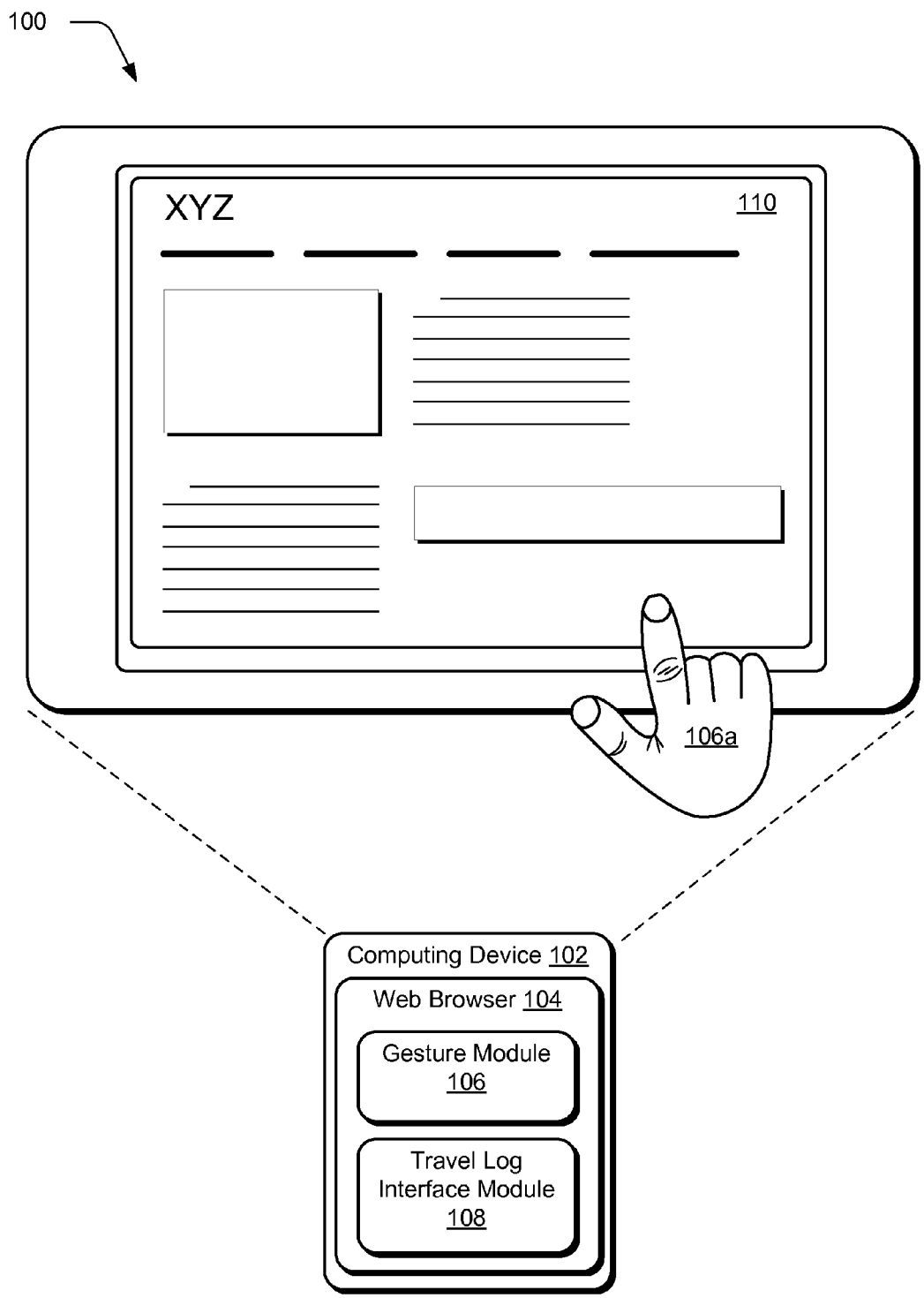
FIG. 1 is an illustration of an environment in an example implementation in accordance with one or more embodiments.

FIG. 1 is an illustration of an environment 100 in an example implementation that is operable to employ techniques described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. In one or more embodiments, the computing device is embodied as a slate-type or tablet-type form factor device that can typically be held by a user in one hand, and interacted with using the other hand.

Thus, the computing device 102 may range from full resource devices with substantial memory and processor resources (e.g., personal computers, game consoles, slate or tablet-form factor device) to a low-resource device with limited memory and/or processing resources (e.g., traditional set-top boxes, hand-held game consoles). The computing device 102 also includes software that causes the computing device 102 to perform one or more operations as described below.

Computing device 102 includes a web browser 104 that is operational to provide web browsing functionality as described in this document. The web browser can be implemented in connection with any suitable type of hardware, software, firmware or combination thereof. In at least some embodiments, the web browser is implemented in software that resides on some type of tangible, computer-readable medium examples of which are provided below.

Web browser 104 includes or otherwise makes use of, in this example, a gesture module 106 and a travel log interface module 108. Gesture module 106 is representative of functionality that can recognize a wide variety of gestures that can be employed in connection with web browsing activities. In at least some embodiments, one or more gestures can be employed in connection with travel log navigation techniques described herein. The gestures may be recognized by module 106 in a variety of different ways. For example, the gesture module 106 may be configured to recognize a touch input, such as a finger of a user's hand 106a as proximal to display device 110 of the computing device 102 using touch screen functionality.

Alternately or additionally, the gesture module 106 can be configured to recognize touchless input, such as movements of the user's hand 106a and/or other parts of a user's body that are detected via one or more cameras operably associated with the computing device 102. Thus, the gesture module 106 can support a variety of different touch-based and touchless gesture techniques through recognition and leverage of a division between touch-based and touchless inputs, as well as different types of inputs.

The travel log interface module 108 is configured to provide a visual travel log of visited content (e.g., web pages) that can be presented as a visual element of the web browser 104 and can enable a user to navigate through visited content. In embodiments, navigation through the visited content can be via direct manipulation of the content using touch-based and/or touchless gestures that are recognized by the gesture module 106.

Figure 2:
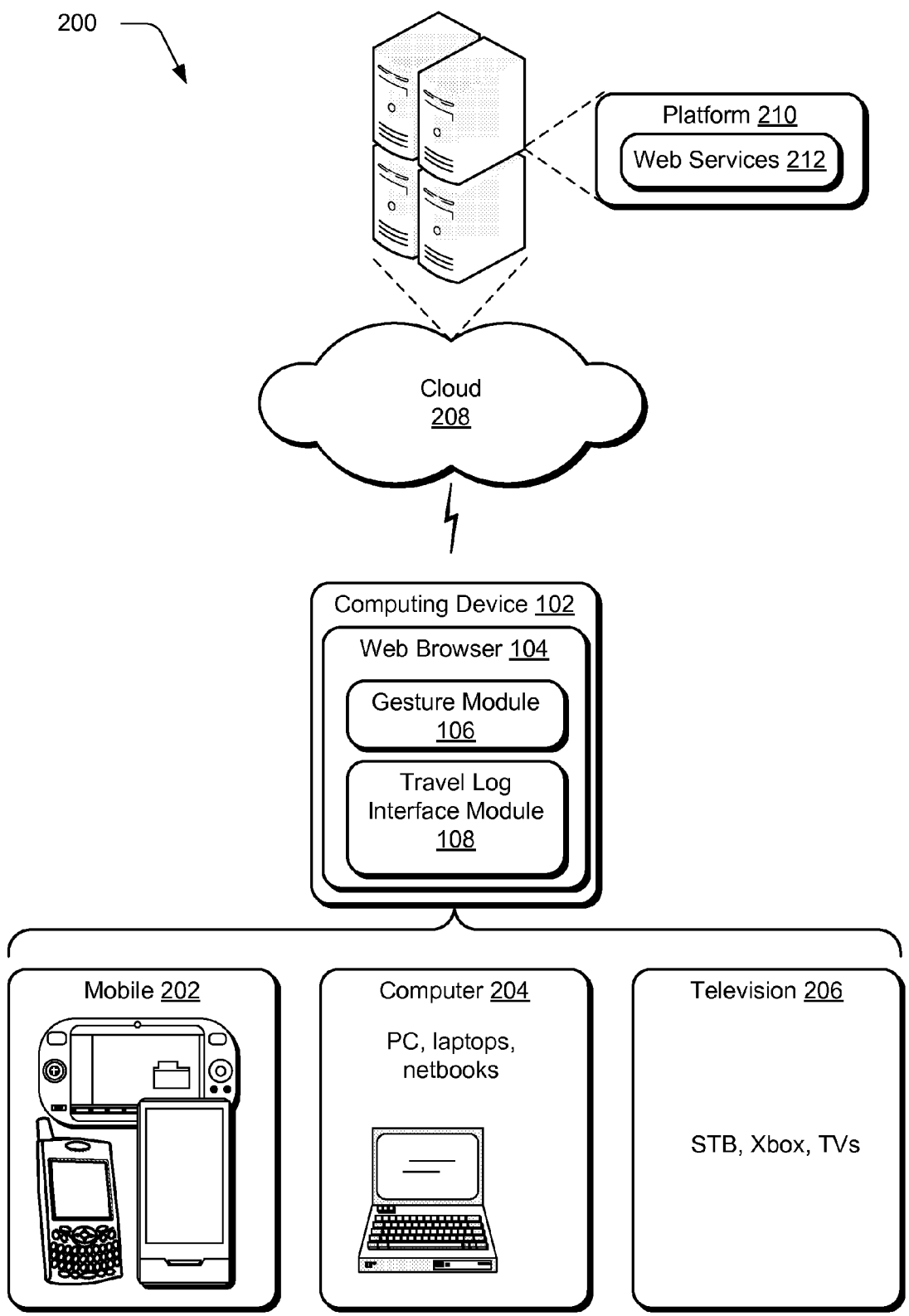
FIG. 2 is an illustration of a system in an example implementation showing FIG. 1 in greater detail.

FIG. 2 illustrates an example system 200 showing the web browser 104 as being implemented in an environment where multiple devices are interconnected through a central computing device. The central computing device may be local to the multiple devices or may be located remotely from the multiple devices. In embodiments, the central computing device is a "cloud" server farm, which comprises one or more server computers that are connected to the multiple devices through a network or the Internet or other means.

Further to one or more embodiments, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices.

In implementations, a "class" of target device is created and user experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size or form factor and thus the computing device 102 may be configured as one of these device classes in this example system 200. For instance, the computing device 102 may assume the mobile 202 class of device which includes mobile telephones, music players, game devices, slate-type or tablet-type form factor devices and so on.

The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The gesture techniques supported by the gesture module 106 may be detected using touch screen functionality in the mobile configuration 202, track pad functionality of the computer 204 configuration, detected by a camera as part of support of a natural user interface (NUI) that does not involve contact with a specific input device (e.g., touchless input), and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Example Travel Log

Figure 3:
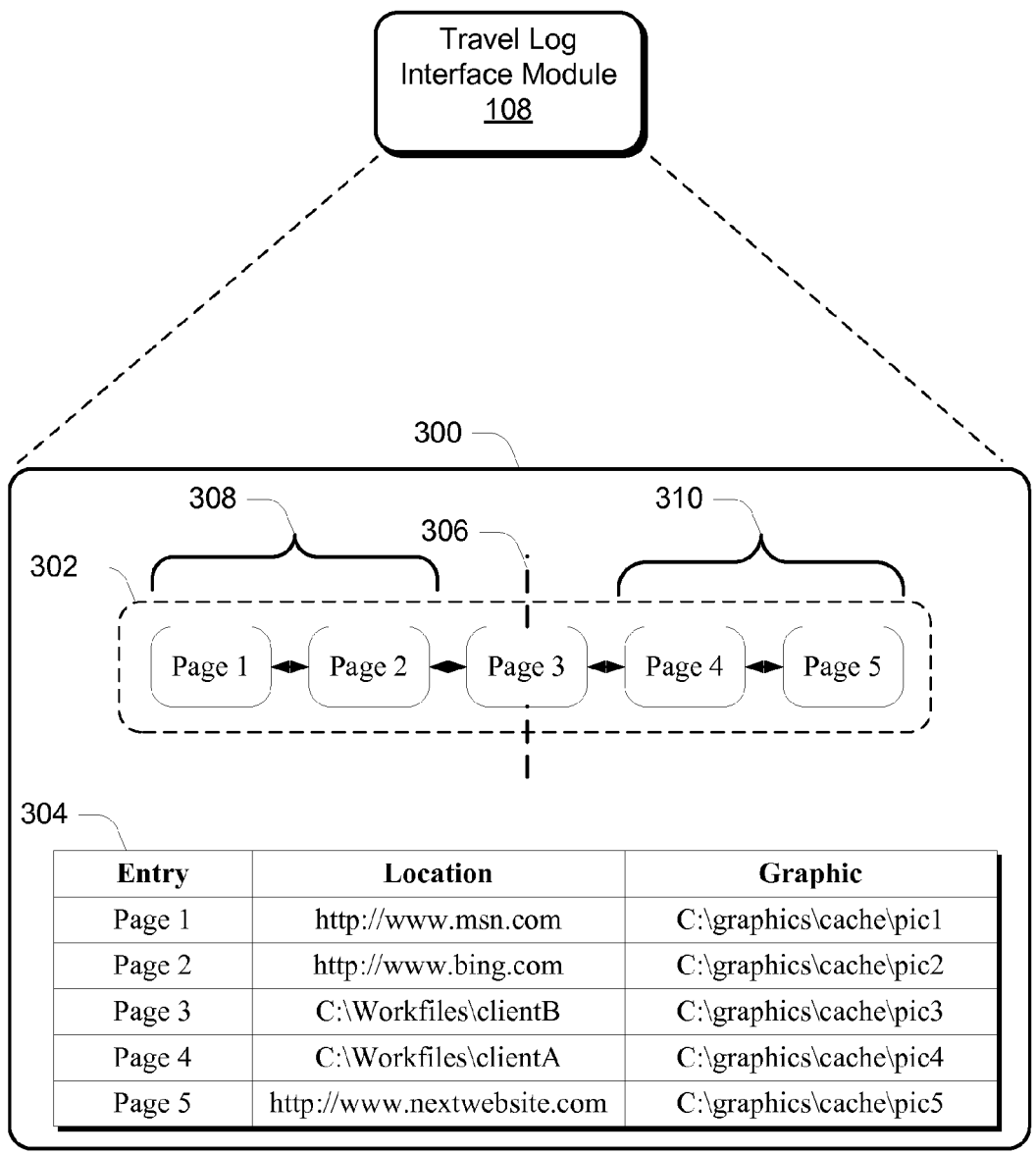
FIG. 3 illustrates an example travel log in accordance with one or more embodiments.

FIG. 3 illustrates an example travel log 300 in accordance with one or more embodiments. In implementations, the travel log 300 can be generated and/or maintained by the travel log interface module 108 to implement techniques discussed herein. Included as part of the travel log 300 is a page timeline 302 and a page information table 304. In at least some embodiments, the page timeline 302 is a temporal record of web pages and/or other instances of content that are visited via the web browser 104. For example, as a user visits web pages via the web browser 104, the page timeline 302 tracks each web page in a sequence that corresponds to the order in which the web pages are visited.

To illustrate example techniques for travel log navigation discussed herein, the page timeline 302 includes a current page 306, previous pages 308, and subsequent pages 310. In at least some embodiments, the current page 306 corresponds to a web page that is currently in focus in the web browser 104. Further to such embodiments, the previous pages 308 correspond to web pages that were visited prior to the current page 306, and the subsequent pages 310 correspond to web pages that were visited subsequent to an initial visit to the current page 306. For example, the current page 306 can correspond to a web page that a user returns to after visiting the subsequent pages 310.

In at least some embodiments, the page information table 304 stores information for web pages tracked by the page timeline 302. For example, the "Page 1" entry in the information table 304 corresponds to "Page 1" of the page timeline 302. Information that can be stored by the page information table 304 includes web page addresses, such as uniform resource locators (URLs) for pages, network locations for pages, memory locations for pages, and so on.

The page information table 304 also stores graphical representations of the web pages from the page timeline 302. For example, when a user navigates the web browser 104 to a web page, a "snapshot" of the web page can be captured. In at least some embodiments, the snapshot can correspond to a cached image of the web page as it appeared when the user navigated to the page.

Additionally or alternatively, a graphical representation of a page can include an icon or other static image that serves as a placeholder for the page in the travel log 300. For example, consider a scenario where a user visits a web page that includes security-sensitive information, such as a user account page of a bank website. In embodiments, a snapshot of such sensitive information is not captured to avoid the possibility of revealing the security-sensitive information to other entities that may have access to the information table 304. In such embodiments, a placeholder image for a web page (e.g., an icon, text, and so on) can be substituted for a page snapshot in the page information table 304.

In example implementations, the graphical representations of web pages stored by the page information table 304 can be used as placeholders for web pages when a user navigates through the travel log interface. For example, as a user navigates the travel log interface through web pages from the page timeline 302, graphical representations of the web pages can be retrieved from the page information table 304 and displayed as placeholders for the web pages. As discussed in more detail below, when a user pauses and/or stops navigating the travel log interface at a particular web page, a current version of the web page can be loaded to replace a placeholder for the web page.

Travel Lot Interface Navigation

This section discusses example techniques for navigating a travel log user interface in accordance with one or more embodiments. The example techniques are discussed with reference to user manipulation of web pages, such as using gesture-based input techniques discussed above. This is not intended to be limiting, however, and a variety of different types of content can be navigated via a travel log, such as images, video, audio, and so on. In at least some embodiments, the example techniques can be implemented via aspects of the environment 100 and/or the system 200.

Figure 4:
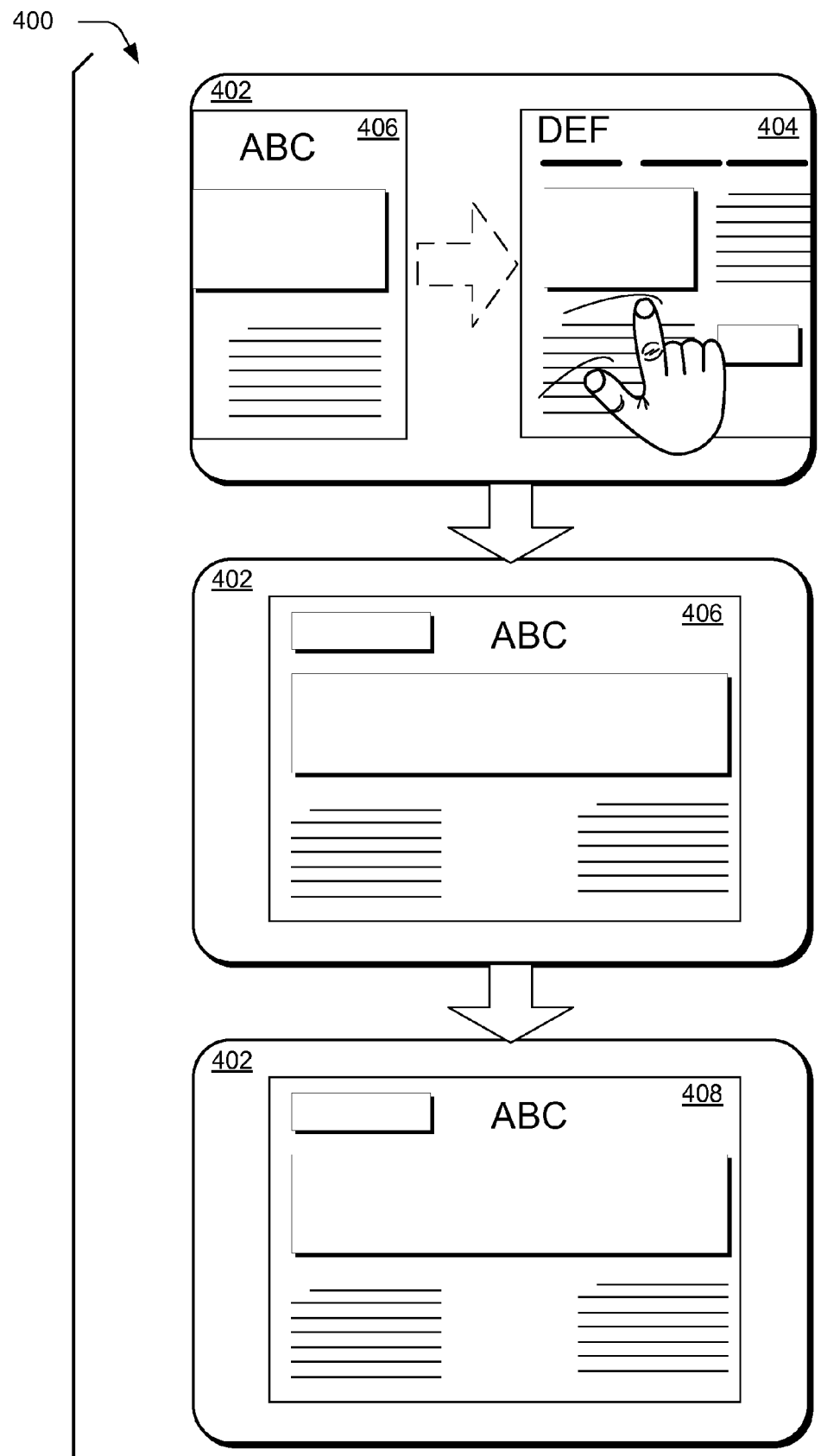
FIG. 4 illustrates an example travel log navigation in accordance with one or more embodiments.

FIG. 4 illustrates an example travel log navigation in accordance with one or more embodiments, generally at 400. Included as part of the travel log navigation 400 is a graphical user interface (GUI) 402. In at least some embodiments, the GUI 402 is associated with a web browser, such as the web browser 104. Further to the travel log navigation 400, a user manipulates a web page 404 toward the right side of the GUI 402. As the web page 404 moves toward the right side of the GUI 402, a placeholder 406 pans into the GUI 402 from the left side of the interface. As used herein, the terms "pan", "pans", and/or "panning" refer to movement of visual objects in a GUI, such as movement into, within, and/or out of a GUI. For example, an object (e.g., a placeholder) can pan in a GUI responsive to a manipulation of a web page and/or another placeholder. In at least some embodiments, the placeholder 406 is a graphical representation of a web page that was visited previously to the web page 404. For example, with reference to FIG. 3, the web page 404 can correspond to the current page 306, and the placeholder 406 can correspond to one of the previous pages 308.

Further to the travel log navigation 400, the user manipulates the web page 404 to a "snap point", which causes the web page 404 to pan out of the GUI 402 and the placeholder 406 to pan into and occupy the GUI 402. In at least some embodiments, a snap point refers to a manipulation threshold that, when attained and/or exceeded, can trigger events related to the travel log. For example, the snap point can refer to a threshold amount of a web page (e.g., a third of the web page, half of the web page, and so on) that has been moved out of the GUI 402. Additionally or alternatively, the snap point can be a correlation between a particular point on a web page and a location on a display screen. For example, the snap point can be reached when an edge of the web page 404 overlaps and/or passes a particular column of pixels in the GUI 402. Further to embodiments, when the web page 404 is manipulated to a snap point, the web page can be visually dimmed to indicate that the snap point has been reached and/or that a transition in travel log behavior is about to occur. For example, the web page can be dimmed to indicate that the web page is panning out of the GUI 402 and/or that a new web page is being loaded for the GUI.

After the placeholder 406 occupies the GUI 402, the placeholder 406 is replaced with a web page 408, which corresponds to a current version of a web page represented by the placeholder. For example, the travel log interface module 108 can request that the web browser 104 provide the web page 408 to replace the placeholder 406.

Figure 5:
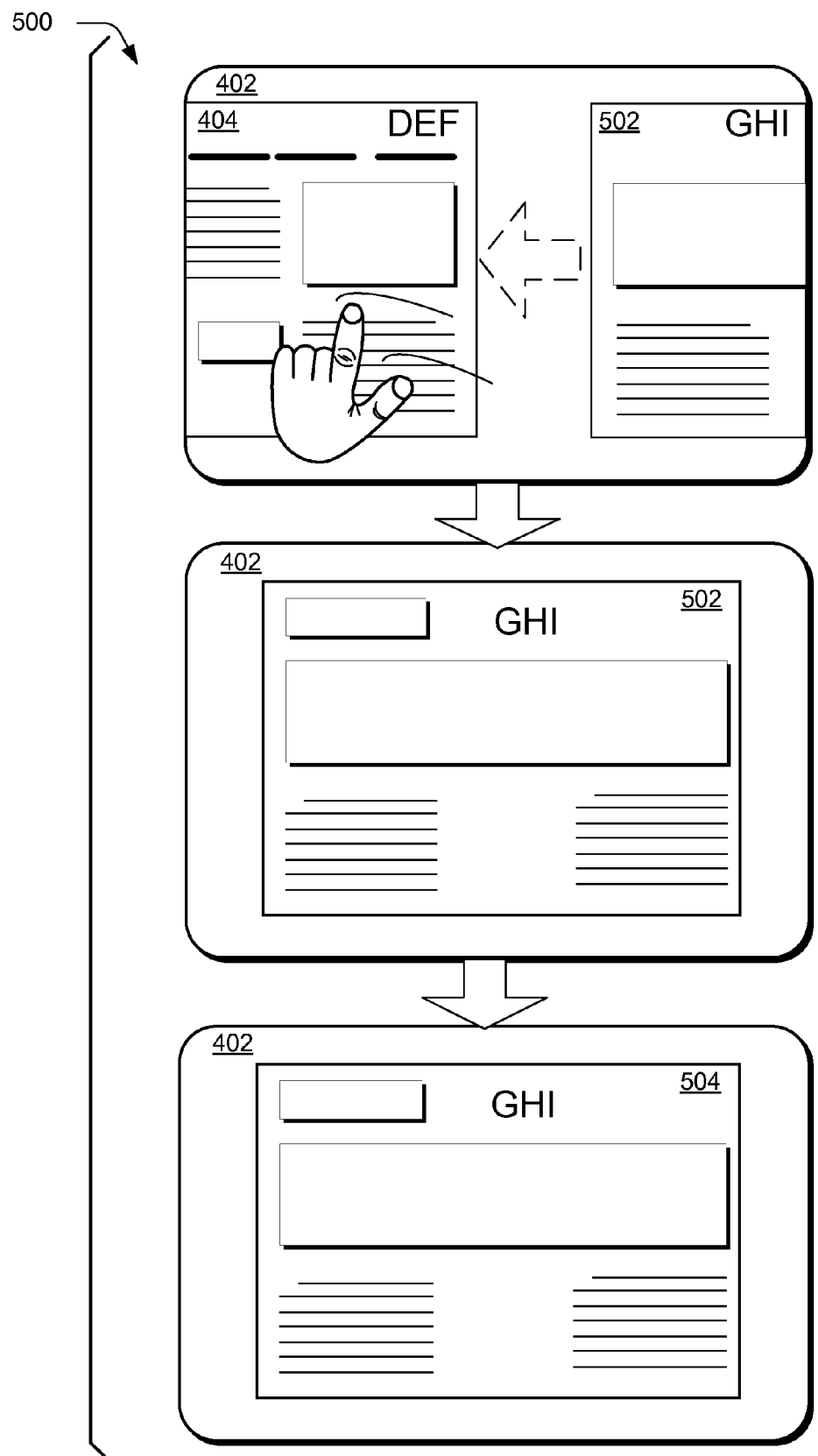
FIG. 5 illustrates an example travel log navigation in accordance with one or more embodiments.

FIG. 5 illustrates another example travel log navigation in accordance with one or more embodiments, generally at 500. Travel log navigation 500 is similar in several aspects to travel log navigation 400, discussed above. In travel log navigation 500, however, a user manipulates the web page 404 toward the left side of the GUI 402. In response to this manipulation, a placeholder 502 pans into the GUI 402 from the right side of the GUI. In at least some embodiments, the placeholder 502 is a graphical representation of a web page that was initially visited subsequent to the web page 404. For example, with reference to FIG. 3, the web page 404 can correspond to the current page 306, and the placeholder 502 can correspond to one of the subsequent pages 310.

Further to the travel log navigation 500, the user manipulates the web page 404 to a snap point, which causes the web page 404 to pan out of the GUI 402 and the placeholder 502 to pan into and occupy the GUI 402. After the placeholder 502 occupies the GUI 402, the placeholder 502 is replaced with a web page 504, which corresponds to a current version of the web page represented by the placeholder.

Figure 6:
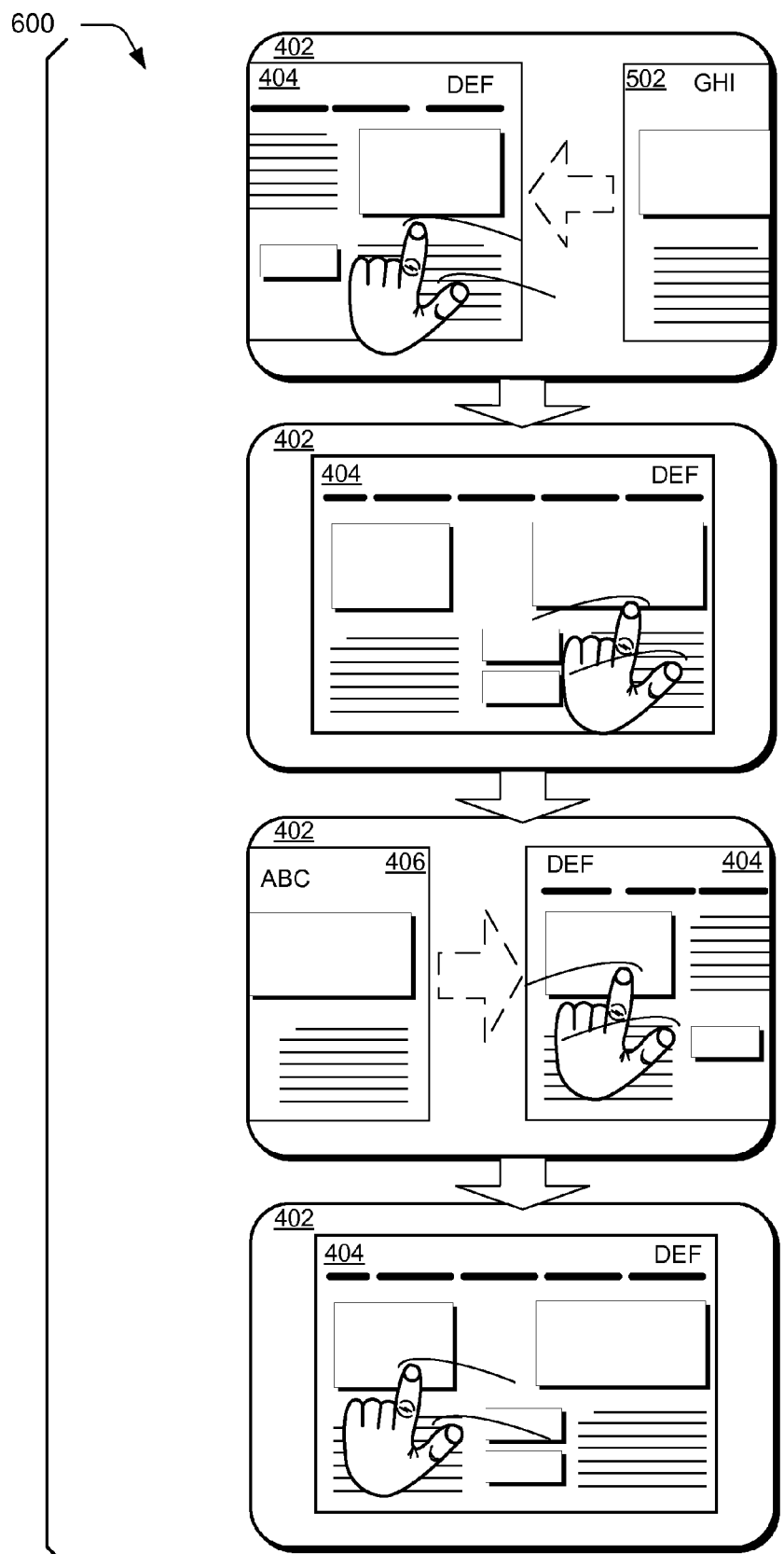
FIG. 6 illustrates an example travel log navigation in accordance with one or more embodiments.

FIG. 6 illustrates another example travel log navigation in accordance with one or more embodiments, generally at 600. In the travel log navigation 600, a user manipulates the web page 404 toward the left side of the GUI 402 and away from focus in the GUI. This causes the placeholder 502 to pan partially into the GUI 402 from the right side of the GUI. As discussed above, in embodiments the placeholder 502 is a graphical representation of a web page that was visited subsequent to the web page 404.

Before the web page 404 reaches a snap point, however, the user returns the web page 404 toward focus in the GUI 402. In embodiments, the user can return the web page 404 toward focus in the GUI 402 by manipulating the web page 404 toward the center of the GUI. Additionally or alternatively, the user can return the web page 404 toward focus in the GUI 402 by releasing the web page 404 before it reaches the snap point, which can cause the web page 404 to automatically pan back into the center of the GUI. In at least some embodiments, returning the web page 404 to focus in the GUI 402 causes the placeholder 502 to pan out of the GUI, e.g., to pan out of the right side of the GUI.

Further to the travel log navigation 600, the user then manipulates the web page 404 toward the right side of the GUI 402. This causes the placeholder 406 to pan partially into the GUI 402 from the left side of the GUI. As discussed above, in embodiments the placeholder 406 is a graphical representation of a web page that was visited previously to the web page 404.

Before the web page 404 reaches a snap point, however, the user returns the web page 404 to focus in the GUI 402. In at least some embodiments, returning the web page 404 to focus in the GUI 402 causes the placeholder 406 to pan out of the GUI 402, e.g., to pan out of the left side of the GUI.

Thus, travel log navigation 600 illustrates an example embodiment of a travel log "peek" mode, whereby a user can manipulate a current web page of a travel log to view placeholders for other web pages (e.g., previous and/or subsequent web pages) of the travel log. In at least some embodiments, the peek mode can enable a user to view a placeholder without causing a web browser to load a web page associated with the placeholder.

Figure 7:
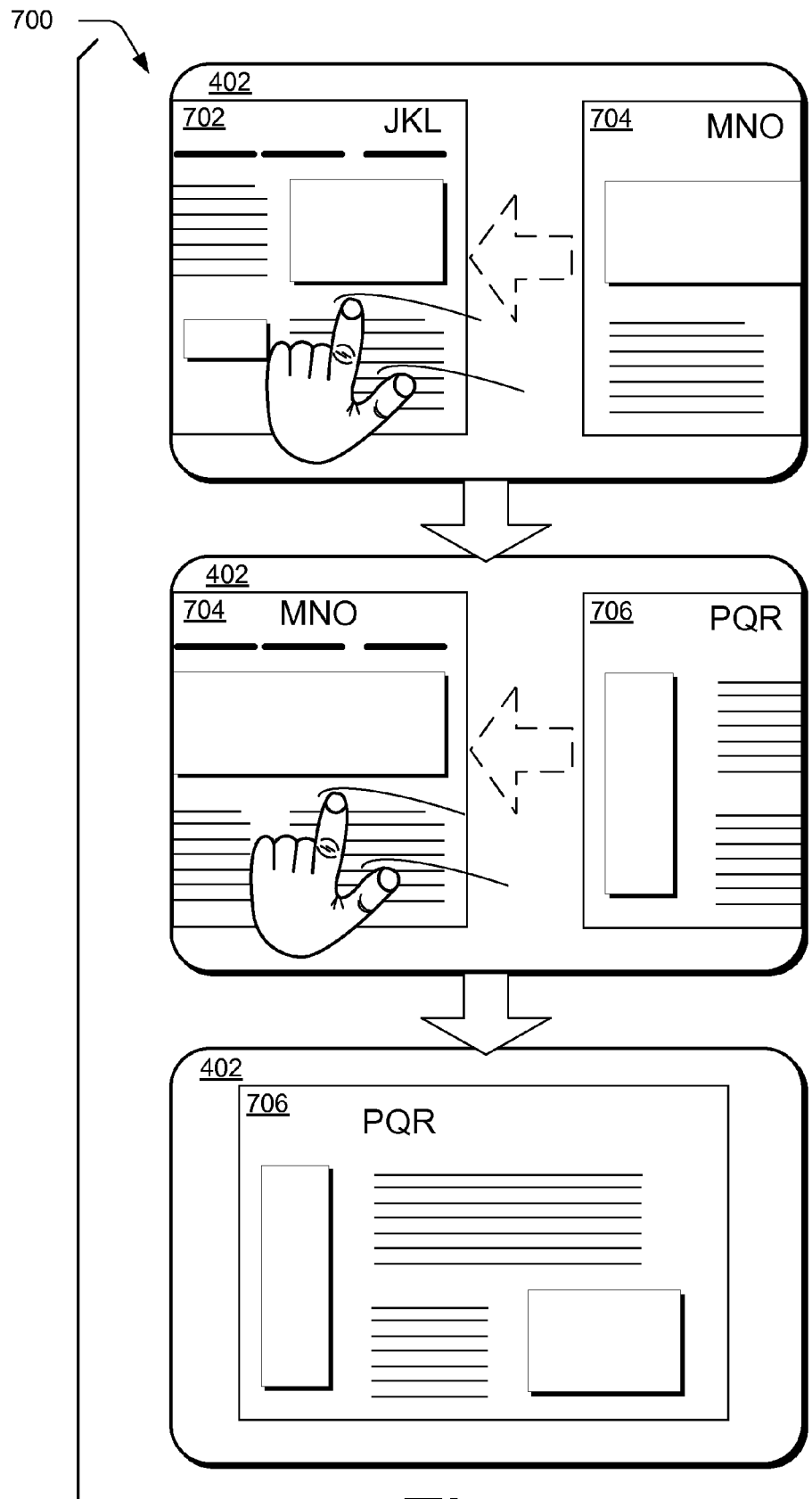
FIG. 7 illustrates an example travel log navigation in accordance with one or more embodiments.

FIG. 7 illustrates another example travel log navigation in accordance with one or more embodiments, generally at 700. In the travel log navigation 700, a user manipulates a web page 702 toward the left side of the GUI 402. This causes a placeholder 704 to pan into the GUI 402 from the right side of the GUI. The user then manipulates the placeholder 704 toward the left side of the GUI 402, which causes the placeholder 704 to pan out of the GUI and a placeholder 706 to pan into the GUI from the right side of the GUI. In at least some embodiments, the placeholder 704 pans into and out of the GUI 402 without a web page associated with the placeholder 704 being loaded.

Further to example implementations, the placeholder 706 represents a particular web page. After the placeholder 706 pans into the GUI 402, a current version of the particular web page is loaded and replaces the placeholder 706 in the GUI. In embodiments, a predetermined delay period (e.g., in milliseconds) occurs between the placeholder 706 panning into the GUI 402 and an initiation of a loading process for the current version of the web page. Implementing the predetermined delay period can enable a user to manipulate a placeholder into and out of a GUI without triggering a loading process for a web site associated with the placeholder.

In embodiments, the travel log navigation 700 is an example of a "multi-navigation" mode, whereby a user can manipulate multiple web pages and/or placeholders in succession through a GUI. For example, user manipulation can cause one or more placeholders to pan into and out of a GUI without web pages associated with the placeholders being loaded. Such embodiments can enable a user to navigate through multiple intermediate placeholders of a travel log to locate a particular web page while conserving processing and/or network resources that would be used to load web pages associated with the intermediate placeholders.

While the techniques for travel log navigation are discussed with reference to particular regions of a GUI (e.g., "right side", "left side", "center", and so on), this is done for purposes of illustration only and is not intended to be limiting. Further, it is to be appreciated that in some embodiments, manipulation of content toward a particular region of a GUI and/or toward a particular edge of a GUI can cause different travel log navigation behaviors without departing from the spirit and scope of the claimed embodiments.

Example Methods

The following discussion describes methods that can be implemented in accordance with one or more embodiments. Aspects of the methods can be implemented in hardware, firmware, software, or a combination thereof. The methods are shown as a set of blocks that specify operations performed by one or more devices and are not necessarily limited to the orders shown for performing the operations by the respective blocks. In portions of the following discussion, reference will be made to features and aspects of embodiments discussed elsewhere herein. For example, aspects of the methods can be implemented via interaction between the gesture module 106 and the travel log interface module 108.

Figure 8:
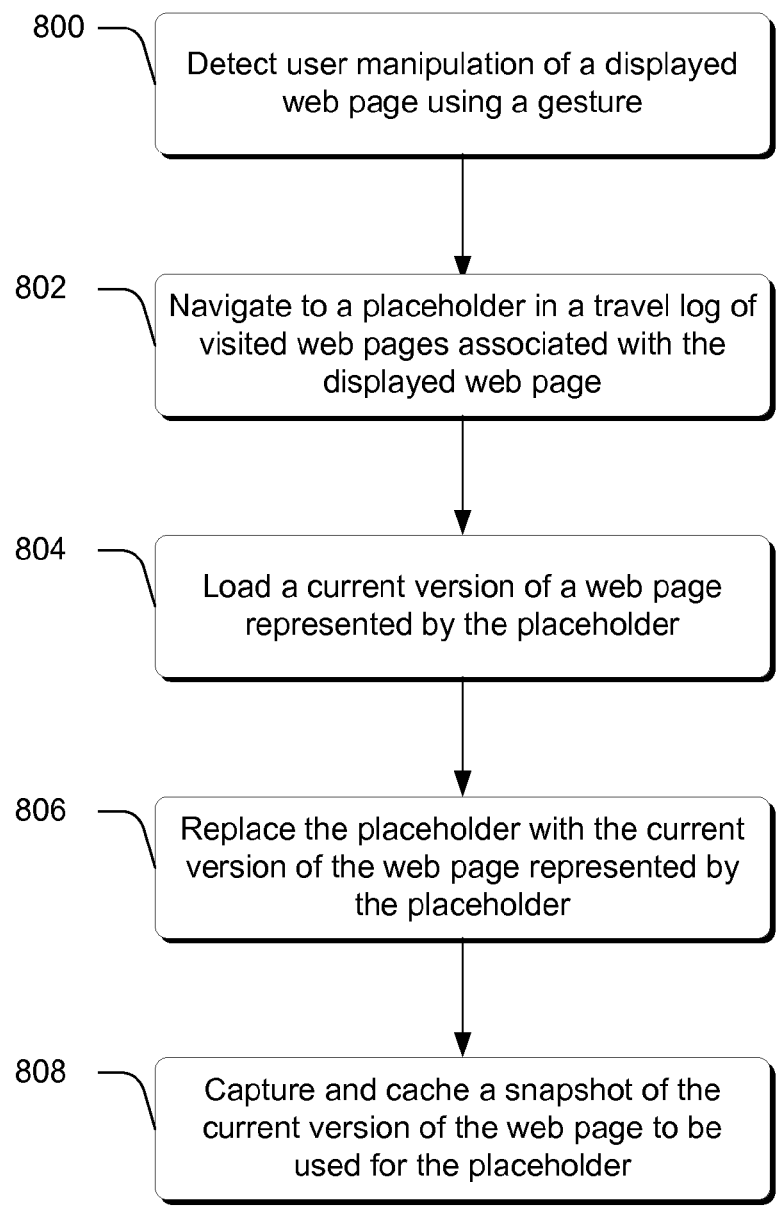
FIG. 8 is a flow diagram that describes steps in a method in accordance with one or more embodiments.

FIG. 8 is a flow diagram that describes steps in a method in accordance with one or more embodiments. Step 800 detects a user manipulation of a displayed web page using a gesture. In example embodiments, the user manipulation can be via one or more of the gesture techniques discussed herein. Step 802 navigates to a placeholder in a travel log of visited web pages associated with the displayed web page. In embodiments, the placeholder can represent a web page that is previous or subsequent to the displayed web page in the travel log. As discussed above, the placeholder can be a cached image of a web page represented by the placeholder. Alternatively, the placeholder can be a graphic icon or text that is associated with the web page represented by the placeholder, e.g., as part of an entry in the page information table 304. Further to at least some embodiments, navigating to the placeholder can include panning the placeholder into a GUI.

Step 804 loads a current version of a web page represented by the placeholder. In embodiments, the current version of the web page can be loaded in the background while the placeholder is being displayed. Step 806 replaces the placeholder with the current version of the web page represented by the placeholder. For example, the current version of the web page can replace the placeholder in a web browser user interface.

Step 808 captures and caches a snapshot of the current version of the web page to be used for the placeholder. In implementations, the snapshot can be a screenshot of the current version of the web page that is stored and/or maintained as part of an entry for the web page in the page information table 304

Figure 9:
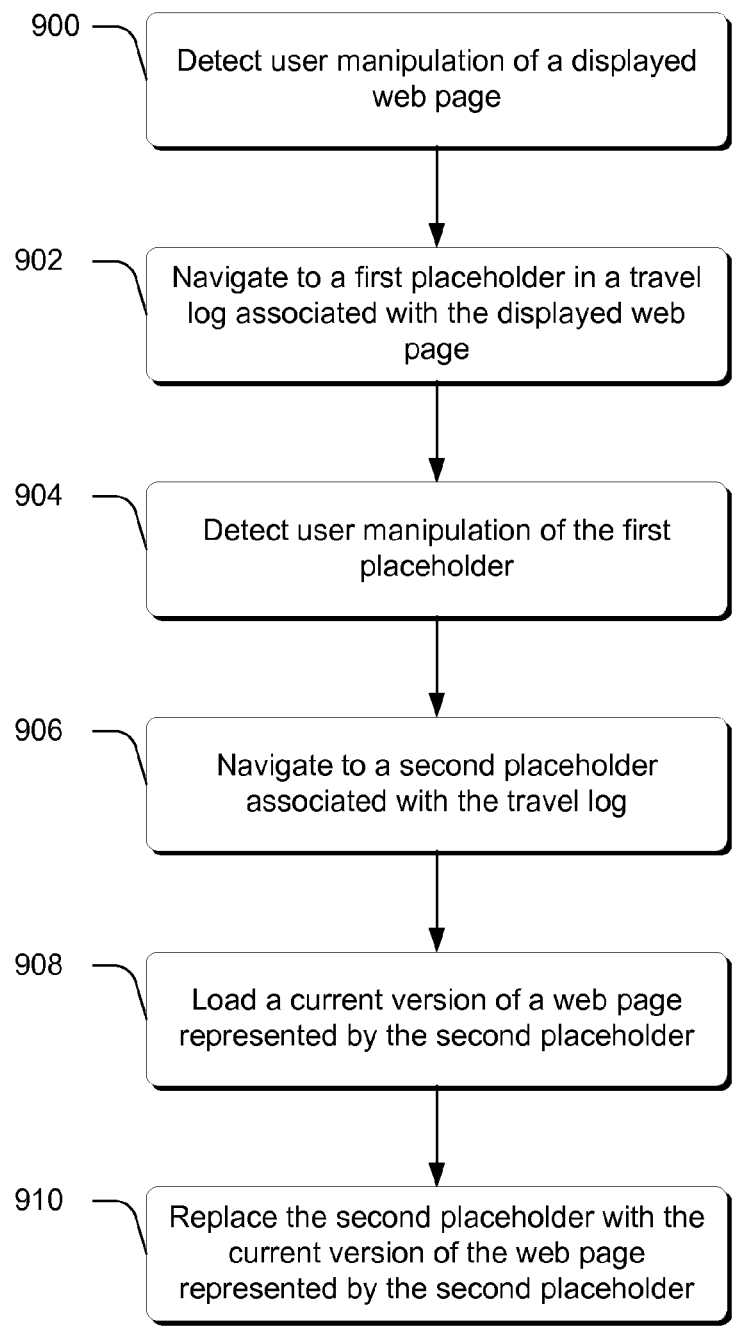
FIG. 9 is a flow diagram that describes steps in a method in accordance with one or more embodiments.

FIG. 9 is a flow diagram that describes steps in a method in accordance with one or more embodiments. In embodiments, FIG. 9 is an example of the "multi-navigation" mode discussed above. Step 900 detects a user manipulation of a displayed web page. Step 902 navigates to a first placeholder in a travel log associated with the displayed web page. In embodiments, navigation to the first placeholder can cause a web page represented by the first placeholder to begin loading in the background, e.g., by a web browser.

Step 904 detects a user manipulation of the first placeholder. In embodiments where the web page represented by the first placeholder is being loaded, the loading process can be stopped in response to the user manipulation of the first placeholder. Step 906 navigates to a second placeholder associated with the travel log. In at least some embodiments, navigating to the second placeholder can occur in response to the user manipulation of the first placeholder to a snap point.

Step 908 loads a current version of a web page represented by the second placeholder. In embodiments, the current version of the web page can be loaded in the background while the second placeholder is being displayed. Step 910 replaces the second placeholder with the current version of the web page represented by the second placeholder. For example, the current version of the web page can replace the second placeholder in a web browser user interface.

Figure 10:
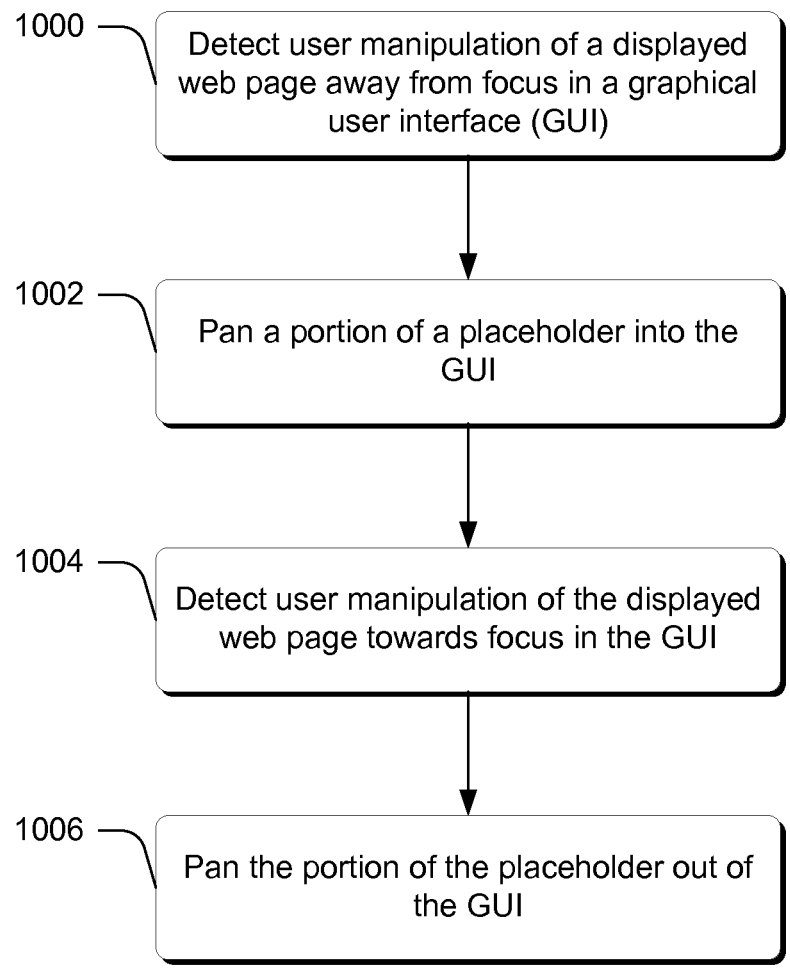
FIG. 10 is a flow diagram that describes steps in a method in accordance with one or more embodiments.

FIG. 10 is a flow diagram that describes steps in a method in accordance with one or more embodiments. Step 1000 detects a user manipulation of a displayed web page away from focus in a graphical user interface (GUI). For example, the user can manipulate the displayed web page away from the center of the GUI. Step 1002 pans a portion of a placeholder into the GUI. As discussed above, in embodiments the placeholder can represent a web page that is previous or subsequent to the displayed web page in a travel log. Further to embodiments, the portion of the placeholder can be panned into the GUI from an edge or combination of edges of the GUI.

Step 1004 detects a user manipulation of the displayed web page toward focus in the GUI. For example, the user can manipulate the displayed web page toward a center of the GUI. Step 1006 pans the portion of the placeholder out of the GUI. For example, the portion of the placeholder can be panned out of the GUI responsive to the manipulation of the displayed web page toward focus in the GUI.

In at least some embodiments, portions of the placeholder can be panned into and/or out of the GUI without causing a web page represented by the placeholder to begin loading. For example, if the displayed web page is not manipulated to a snap point, a web page represented by the placeholder may not begin loading. Additionally or alternatively, a web page represented by the placeholder may begin loading when the placeholder is panned into the GUI, e.g., in response to the displayed web page being manipulated to a snap point. In such embodiments, when the displayed web page is manipulated toward focus, the process of loading the web page represented by the placeholder may pause or stop.

Secure Placeholders

As mentioned above, in some scenarios a web page may include security-sensitive information, such as financial information, personally identifiable information, health records, and so on. In such scenarios, it may be imprudent to cache an image of a web page to be used as a placeholder. For example, caching an image of a web page that includes security-sensitive information may risk exposing the information to an unauthorized entity, such as an entity that has access to a device and/or system on which the image of the web page is cached.

In embodiments, a placeholder for a web page that includes-security sensitive information can include a visual indicia (e.g., an icon and/or text) that represents the web page but that does not include a cached image (e.g., a snapshot) of the web page. Alternatively or additionally, the visual indicia can include a snapshot of the web page with security-sensitive information visually obscured or removed from the snapshot. In embodiments, obscuring or removing the security-sensitive information from the snapshot can prevent such information from being discerned from the snapshot, either through visual inspection of the snapshot or by inspecting the underlying data of the snapshot.

Further to embodiments, a web page can be designated as "do not cache" to prevent a cached image of the web page from being captured and/or to cause security-sensitive information to be visually obscured or removed from a cached image of the web site. In such embodiments, the web page can be designated as "do not cache" using a variety of techniques. For example, a web page author and/or administrator can include code in the web page (e.g., in markup) that designates the web page as "do not cache". When a user navigates to the web page, a web browser or other functionality (e.g., the web browser 104 and/or the travel log interface module 108) can inspect web page code and recognize the "do not cache" code. In response to recognizing the code, the web browser or other functionality can prevent the web page from being cached and/or initiate one or more data obfuscation techniques.

Additionally or alternatively, an end-user can designate a web page and/or a website as "do not cache". For example, the web browser 104 can include a selectable option that enables a user to mark a particular web page, website, and/or domain name as "do not cache". A "do not cache" designation can be noted by the travel log interface module 108, e.g., as part of the page information table 304. When the web browser navigates to the web page, website, and/or domain name, the web browser or other functionality can prevent web page caching behavior from being initiated, and/or can implement one of more data obfuscation techniques.

Further to at least some embodiments, when a snapshot of a web page is prevented from being cached, a visual indicia that represents the web page can be generated and/or retrieved to be used as a placeholder for the web page. For example, the visual indicia can be provided by a user of a web browser, a web page author, a web site administrator, and so on.

Figure 11:
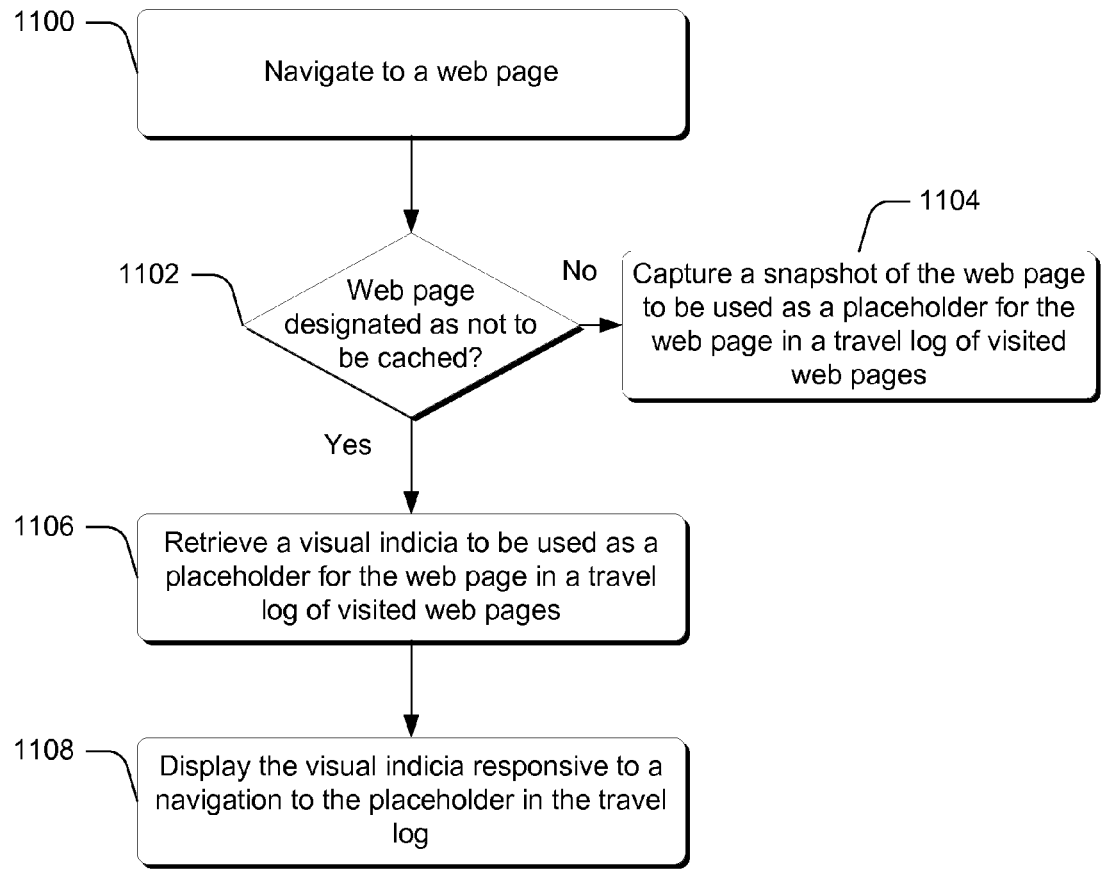
FIG. 11 is a flow diagram that describes steps in a method in accordance with one or more embodiments.

FIG. 11 is a flow diagram that describes steps in a method for implementing a secure placeholder in accordance with one or more embodiments. Step 1100 navigates to a web page. For example, a user can navigate the web browser 104 to a particular web page. Step 1102 determines whether the web page is designated as not to be cached. Ways of determining and/or designating that a web page is not to be cached are discussed above. If the web page is not designated as not to be cached ("No"), step 1104 captures a snapshot of the web page to be used as a placeholder for the web page in a travel log of visited web pages. For example, a snapshot of the web page can be captured and cached, e.g., as part of the page information table 304.

If the web page is designated as not to be cached ("Yes"), step 1106 retrieves a visual indicia to be used as a placeholder for the web page in a travel log of visited web pages. As mentioned above, in embodiments the visual indicia can be retrieved from a user of a web browser, a web page author, a website administrator, and so on, and stored as part of an entry for the web page in the page information table 304. Step 1108 displays the visual indicia responsive to a navigation to the placeholder in the travel log. In embodiments, the navigation to the placeholder can occur as part of one or more of the travel log navigation scenarios and/or methods discussed above.

Example Device

Figure 12:
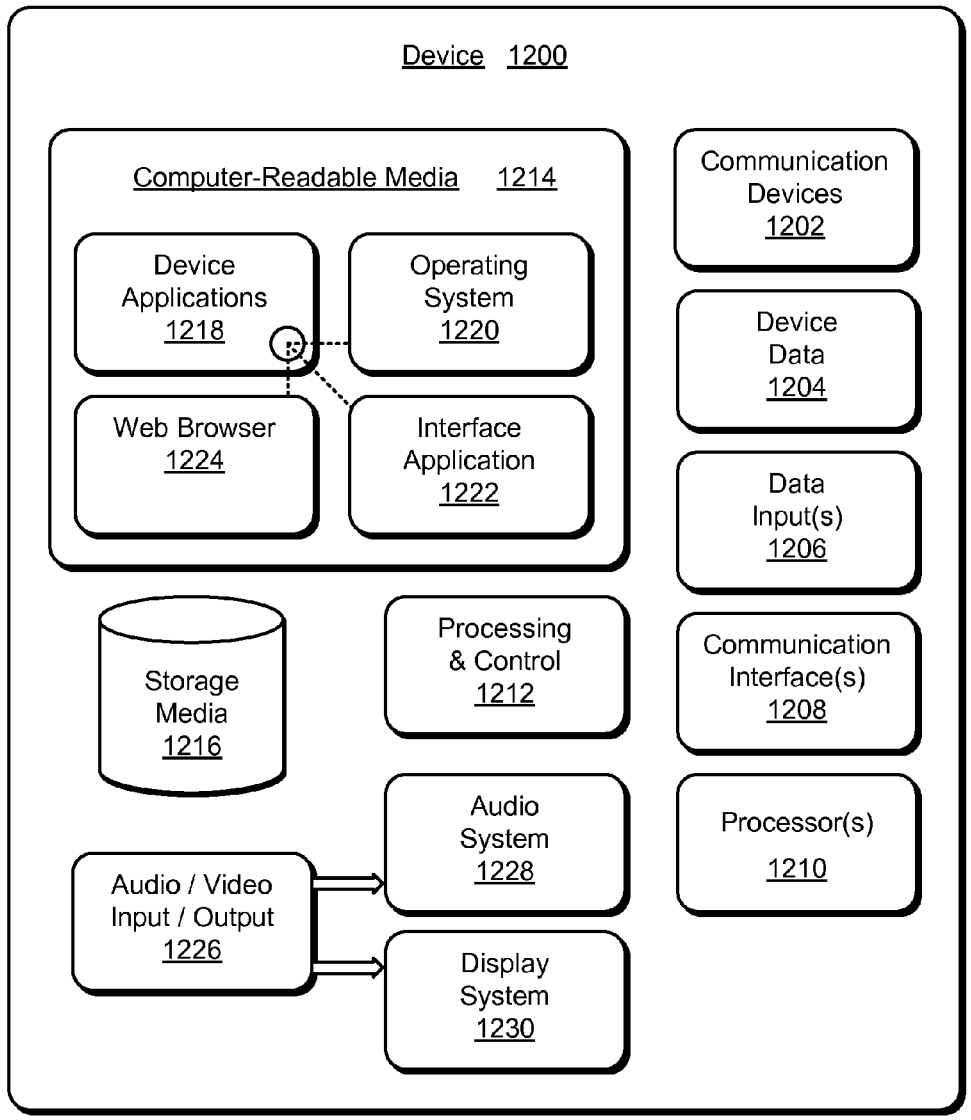
FIG. 12 illustrates an example computing device that can be utilized to implement various embodiments described herein.

FIG. 12 illustrates various components of an example device 1200 that can be implemented as any type of portable and/or computer device as described with reference to FIGS. 1 and 2 to implement embodiments described herein. Device 1200 includes communication devices 1202 that enable wired and/or wireless communication of device data 1204 (e.g., received data, data that is being received, data scheduled for broadcast, data packets of the data, etc.). The device data 1204 or other device content can include configuration settings of the device, media content stored on the device, and/or information associated with a user of the device. Media content stored on device 1200 can include any type of audio, video, and/or image data. Device 1200 includes one or more data inputs 1206 via which any type of data, media content, and/or inputs can be received, such as user-selectable inputs, messages, music, television media content, recorded video content, and any other type of audio, video, and/or image data received from any content and/or data source.

Device 1200 also includes communication interfaces 1208 that can be implemented as any one or more of a serial and/or parallel interface, a wireless interface, any type of network interface, a modem, and as any other type of communication interface. The communication interfaces 1208 provide a connection and/or communication links between device 1200 and a communication network by which other electronic, computing, and communication devices communicate data with device 1200.

Device 1200 includes one or more processors 1210 (e.g., any of microprocessors, controllers, and the like) which process various computer-executable or readable instructions to control the operation of device 1200 and to implement the gesture embodiments described above. Alternatively or in addition, device 1200 can be implemented with any one or combination of hardware, firmware, or fixed logic circuitry that is implemented in connection with processing and control circuits which are generally identified at 1212. Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1200 also includes computer-readable media 1214, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1200 can also include a mass storage media device 1216.

Computer-readable media 1214 provides data storage mechanisms to store the device data 1204, as well as various device applications 1218 and any other types of information and/or data related to operational aspects of device 1200. For example, an operating system 1220 can be maintained as a computer application with the computer-readable media 1214 and executed on processors 1210. The device applications 1218 can include a device manager (e.g., a control application, software application, signal processing and control module, code that is native to a particular device, a hardware abstraction layer for a particular device, etc.). The device applications 1218 also include any system components or modules to implement embodiments of the gesture techniques described herein. In this example, the device applications 1218 include an interface application 1222 and a web browser 1224 that are shown as software modules and/or computer applications. The web browser 1224 is representative of software that is used to provide web browsing functionality, including an interface with a device configured to capture gestures, such as a touch screen, track pad, camera, and so on.

Device 1200 also includes an audio and/or video input-output system 1226 that provides audio data to an audio system 1228 and/or provides video data to a display system 1230. The audio system 1228 and/or the display system 1230 can include any devices that process, display, and/or otherwise render audio, video, and image data. Video signals and audio signals can be communicated from device 1200 to an audio device and/or to a display device via an RF (radio frequency) link, S-video link, composite video link, component video link, DVI (digital video interface), analog audio connection, or other similar communication link. In an embodiment, the audio system 1228 and/or the display system 1230 are implemented as external components to device 1200. Alternatively, the audio system 1228 and/or the display system 1230 are implemented as integrated components of example device 1200.

Conclusion

Various embodiments provide a travel log for manipulation of content. In at least some embodiments, the travel log can be presented as a visual element of a web browser and can enable a user to navigate through visited content (e.g., web pages) via manipulation of the content using touch-based and/or touchless gestures.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising: detecting a user manipulation of a first web page of a current browsing session in a graphical user interface (GUI) using one or more gestures to pan through a travel log of web pages in the current browsing session;

navigating, upon the user manipulation causing the first web page to reach a snap point, in the GUI to a placeholder representing a second web page in the travel log of visited web pages associated with the first web page in the current browsing session;

loading a current version of a the second web page represented by the placeholder in response to reaching the snap point while displaying the placeholder representing the second web page in the GUI; and replacing the placeholder representing the second web page automatically in the GUI with the current version of the second web page represented by the placeholder upon completion of the loading.

2. The method of claim 1, wherein said gestures comprise one or more of touch-based gestures or touchless gestures.

3. The method of claim 1, wherein said placeholder comprises a cached image of a previous version of the second web page represented by the placeholder.

4. The method of claim 1,
wherein said travel log tracks a sequence in which the visited web pages were initially visited; and
wherein the second web page represented by the placeholder is previous to or subsequent to the first web page in the sequence.

5. The method of claim 1,
wherein the user manipulation is effective to cause the first web page to move out of view; and
wherein said navigating to a placeholder comprises causing the placeholder to pan into the GUI from one or more edges of the GUI.

6. The method of claim 1, further comprising:
detecting a user manipulation of the current version of the first web page away from focus in GUI;
panning a portion of a different placeholder into the GUI;
detecting a user manipulation of the current version of the first web page toward focus in the GUI; and
panning the portion of the different placeholder out of the GUI in response to the user manipulation of the current version of the first web page toward focus in the GUI.

7. The method of claim 1, further comprising:
capturing a snapshot of the current version of the first web page; and
caching the snapshot to be used for the placeholder in the travel log.

8. A computing device comprising: one or more processors;
one or more non-transitory computer-readable storage media storing instructions which, when executed by the one or more processors, perform operations comprising:
detecting a user manipulation of a first wed web page of a current browsing session displayed in a graphical user interface (GUI) using one or more gestures to pan through a travel log of web pages in the current browsing session;
navigating, upon the user manipulation causing the first web page to reach a snap point, in the GUI to a placeholder representing a second web page in the travel log of visited web pages;
loading a current version of a the second web page represented by the placeholder in response to reaching the snap point while displaying the placeholder representing the second web page in the GUI; and
replacing the placeholder representing the second web page automatically in the GUI with the current version of the second web page upon completion of the loading.

9. The computing device of claim 8, wherein said gestures comprise one or more of touch-based gestures or touchless gestures.

10. The computing device of claim 8, wherein said placeholder comprises a cached image of a previous version of the visited web page represented by the placeholder.

11. The computing device of claim 8, wherein said travel log tracks a sequence in which the visited web pages were initially visited, and wherein the visited web page represented by the placeholder is previous to or subsequent to the displayed web page in the sequence.

12. The computing device of claim 8, wherein said user manipulation causes the displayed web paged to move away from focus in the GUI, and wherein said navigating to a placeholder comprises causing the placeholder to pan into the GUI from one or more edges of the GUI.

13. The computing device of claim 8, wherein the operations further comprise:
detecting a user manipulation of the current version of the web page away from focus in GUI;
panning a portion of a different placeholder into the GUI;
detecting a user manipulation of the current version of the web page toward focus in the GUI; and
panning the portion of the different placeholder out of the GUI in response to the user manipulation of the current version of the web page toward focus in the GUI.

14. The computing device of claim 8, wherein the operations further comprise:
capturing a snapshot of the current version of the visited web page; and
caching the snapshot to be used for the placeholder in the travel log.

15. One or more non-transitory computer-readable media storing computer readable instructions that, when executed by at least one processor, cause the at least one processor to:
detect a user manipulation of a first web page of a current browsing session displayed in a graphical user interface (GUI) using one or more gestures to pan through a travel log of web pages in the current browsing session;
navigate, upon the user manipulation causing the first web page to reach a snap point, in the GUI to a placeholder representing a second web page in the travel log of visited web pages;
load a current version of the second web page represented by the placeholder in response to reaching the snap point while displaying the placeholder representing the second web page in the GUI; and
replace the placeholder representing the second web page automatically in the GUI with the current version of the second web page upon completion of the loading.

16. The one or more computer-readable media of claim 15, wherein said gestures comprise one or more of touch-based gestures or touchless gestures.

17. The one or more computer-readable media of claim 15, wherein said placeholder comprises a cached image of a previous version of the second web page represented by the placeholder.

18. The one or more computer-readable media of claim 15, wherein the instructions, when executed by the at least one processor, cause the at least one processor further to:
track a sequence in which the visited web pages were initially visited, wherein the second web page represented by the placeholder is previous to or subsequent to the first web page in the sequence.

19. The one or more computer-readable media of claim 15, wherein the instructions, when executed by the at least one processor, cause the at least one processor further to:
cause the placeholder to pan into the GUI from one or more edges of the GUI.

20. The one or more computer-readable media of claim 15, wherein the instructions, when executed by the at least one processor, cause the at least one processor further to:
detect a user manipulation of the current version of the first web page away from focus in the GUI;
pan a portion of a different placeholder into the GUI;
detect a user manipulation of the current version of the first web page toward focus in the GUI; and
pan the portion of the different placeholder out of the GUI in response to the user manipulation of the current version of the first web page toward focus in the GUI.

21. The one or more computer-readable media of claim 15, wherein the instructions, when executed by the at least one processor, cause the at least one processor further to:
    capture a snapshot of the current version of the first web page; and
    cache the snapshot to be used for the placeholder in the travel log.

\* \* \* \* \*